United States Patent [19]
Greene

[11] Patent Number: 5,160,679
[45] Date of Patent: Nov. 3, 1992

[54] PROCESS FOR MAKING PARTICLE BOARD INCLUDING THE USE OF ACETOACETAMIDE AS A FORMALDEHYDE SCAVENGER

[76] Inventor: Jack T. Greene, 1302 Chalbena Ave., Columbus, Ga. 31907

[21] Appl. No.: 678,136

[22] Filed: Apr. 1, 1991

Related U.S. Application Data

[63] Continuation-in-part of Ser. No. 400,096, Aug. 29, 1989, abandoned.

[51] Int. Cl.$^5$ .............................................. B27N 3/00
[52] U.S. Cl. .................................. 264/109; 156/62.2; 156/296; 156/331.3; 264/113; 264/122
[58] Field of Search .................... 156/62.2, 296, 331.3, 156/331.9; 264/109, 112, 113, 122, 128

[56] References Cited

U.S. PATENT DOCUMENTS

| | | |
|---|---|---|
| 2,462,358 | 2/1949 | Caldwell . |
| 2,833,670 | 5/1958 | Roth . |
| 2,870,041 | 1/1959 | Waddle et al. . |
| 3,560,412 | 2/1971 | Bernardo . |
| 3,753,934 | 8/1973 | Diethelm . |
| 3,771,957 | 11/1973 | Vail . |
| 3,811,131 | 5/1974 | Gamarra et al. . |
| 3,944,428 | 3/1976 | Schoenberg et al. . |
| 3,957,431 | 5/1976 | Pai et al. . |
| 4,038,229 | 7/1977 | Eisele et al. . |
| 4,127,382 | 11/1978 | Perry . |
| 4,186,242 | 1/1980 | Holmquist . |
| 4,199,322 | 4/1980 | Danna et al. . |
| 4,376,807 | 3/1983 | Cannon et al. . |
| 4,397,756 | 8/1983 | Lehmann . |
| 4,409,293 | 10/1983 | Williams . |
| 4,431,699 | 2/1984 | Hunsucker . |
| 4,443,354 | 4/1984 | Eian . |
| 4,457,978 | 7/1984 | Wawzonek . |
| 4,472,165 | 9/1984 | Gregorian et al. . |
| 4,478,891 | 9/1984 | Westling . |
| 4,478,966 | 9/1984 | Helgesson et al. . |
| 4,501,628 | 2/1985 | McGuire et al. . |
| 4,503,209 | 3/1985 | Lucas . |
| 4,520,176 | 5/1985 | Martin et al. . |
| 4,524,093 | 6/1985 | Devry . |
| 4,536,245 | 8/1985 | Shiau et al. ........................ 156/307.3 |
| 4,564,667 | 1/1986 | Taylor . |
| 4,585,827 | 4/1986 | Remley . |
| 4,652,268 | 3/1987 | Remley . |
| 4,773,911 | 9/1988 | Reinhardt et al. . |

FOREIGN PATENT DOCUMENTS

| | | |
|---|---|---|
| 0013372 | 7/1980 | European Pat. Off. . |
| 0038408 | 10/1981 | European Pat. Off. . |
| 2740207 | 11/1978 | Fed. Rep. of Germany . |
| 2829021 | 1/1980 | Fed. Rep. of Germany . |
| 149182 | 7/1981 | Fed. Rep. of Germany . |
| 48-72308 | 9/1973 | Japan . |
| 331931 | 4/1972 | U.S.S.R. . |

OTHER PUBLICATIONS

Evaluation of Formaldehyde Scavengers–Dec. 1984 pp. 259-264.
Factors Controlling Formaldehyde Release from Durable Press Coton–Sep. 1985–pp. 519-529.
Determination of Free Formaldehyde in Durable Press Fabric: Comparison of Cold Sulfite Method with Headspace Gas Chromatography–pp. 55-63, (Jan. 1986).
The Bimodal Release of Formaldehyde from Cotton Fabric Oct. 1987–pp. 30-31.
New Hydrolysis Method for Total Formaldehyde Analysis in Durable Press Resins or Resin-Treated Fabrics–Mar. 1985–pp. 175-177.
A Search for Potential Formaldehyde Acceptors Dec. 1980–pp. 24/311-316/29.
Carbohydrazide Found to be an Effective Scavenger for Reducing Free Formaldehyde–Jan. 1981–pp. 17/29 thru 38/26.
The chemistry of crease-resist crosslinking agents (Rev. Prog. Coloration vol. 17, 1987), pp. 7 & 8.
Textile Softeners Today: A special in-depth review, pp. 32 & 33.

*Primary Examiner*—Jeff H. Aftergut
*Attorney, Agent, or Firm*—Kennedy & Kennedy

[57] ABSTRACT

Acetoacetamide is used as an effective formaldehyde scavenger in the manufacture of composition board using a urea formaldehyde adhesive resin and in the manufacture of durable press finished fabrics using a nitrogen containing methylol resin.

3 Claims, No Drawings

PROCESS FOR MAKING PARTICLE BOARD INCLUDING THE USE OF ACETOACETAMIDE AS A FORMALDEHYDE SCAVENGER

REFERENCE TO RELATED APPLICATION

This is a continuation-in-part of application Ser. No. 400,096 filed Aug. 29, 1989, now abandoned..

TECHNICAL FIELD

This invention relates to processes for reducing the amount of free formaldehyde released from formaldehyde based resins in the manufacture of wood and textile products.

TERMS

The term "composition board" refers to products made by reducing wood to small particles and re-forming the particles into panels by an adhesive action achieved by the addition of adhesive binders to the particles. Examples of these products are particle board, fiberboard and chip board.

The term "durable press finished fabrics" refers to textile web products made in part or entirely from cellulosic based fibers in which durable press resins are incorporated into the manufacture of the product to impart crease and wrinkle resistance properties. Examples of these products are durable press sheeting, shrink resistant knits and wrinkle resistant shirting.

BACKGROUND OF THE INVENTION

The use of formaldehyde based resins has been fundamental in the manufacture of many wood and textile products for many years. In the wood products industry urea-formaldehyde (UF) resin has been in prevalent use as an adhesive in particle board manufacture with phenolic resins and isocyanate used to a lesser extent. Low cost and ease of use of UF resins have been the driving forces for their acceptance. Resins used in the textile industry are a different type than those used in wood products and have generally been used as chemical finishing agents to impart durable press or shrink resistant properties to cellulosic based fabrics such as shirting and knit materials. In the resin finishing of cellulosic fiber fabrics, nitrogen containing methylol compounds have been preferred because of their ease of application and low cost. The resin most extensively used in recent years for durable press finishes has been dimethylol-dihydroxyethyleneurea (DMDHEU) or a modified version thereof.

Associated with products that contain UF and DMDHEU resins is the release of formaldehyde. Such is measured by large chamber test method FTM-2 for wood products and by AATCC Test Method 112-1984 for textile products.

Formaldehyde was first prepared by A. M. Butlerov in 1859 as a by-product of the synthesis of methylene glycol. It was known to have a pungent odor and to be extremely irritating to the mucous membranes of the eyes, nose, and throat. Because it was a severe irritant even in small amounts, research and development over the years was devoted to developing resins, particularly in the textile industry in order to minimize this form of toxicity. Within the last few years formaldehyde has come under scrutiny as a potential carcinogen. This has served to increase pressure by governmental agencies to reduce or eliminate formaldehyde evolution from wood and textile products.

The chemical industry has responded to the concern over formaldehyde by modifying some of the present formaldehyde based resin systems and by developing formaldehyde resins. Unfortunately, the non-formaldehyde resin systems have been costly to produce. Modified formaldehyde based resins have proven more successful in reducing the level of released formaldehyde from wood and textile products. For example, UF resins used in particle board manufacture have been modified by changing the mole ratio of formaldehyde to urea in the resin system. High fuming resins with mole ratios of 1.5 to 1 have been modified to low fuming resins of 1.1 to 1 mole ratios. This has resulted in a significant reduction in released formaldehyde from particle board. In the durable press finishing of fabrics the pendant N-methylol group (N—$CH_2$-OH) in DMDHEU has been restructured by "capping" with a polyol to form N—$CH_2$—OR where R is traditionally a methoxy of a diethylene glycol ether group. This chemical restructuring stabilizes the resin molecule to hydrolysis thereby reducing the liberation of free formaldehyde from fabrics treated with such modified resins.

In addition to the foregoing there are methods described in the literature other than resin modification that have had some success at reducing the levels of released formaldehyde. Most of these methods have involved additional production processes such as after-washing or post spraying. These are generally considered costly, although effective, alternatives. A method more acceptable to manufacturing has been the use of additive chemicals called formaldehyde scavengers that can suppress or reduce the liberation of free formaldehyde from wood or textile products containing formaldehyde based resins.

Development of formaldehyde scavengers has been more prevalent in textiles than in wood products and dates back some twenty years. Generally, in textiles a formaldehyde scavenger is added to a resin mixture. The mixture is applied to cellulosic based materials in manufacturing processes to produce a product characterized by a reduced level of residual formaldehyde over that of non-treated products. Articles that discuss formaldehyde scavenger development in textile durable press finish of fabrics include R. S. Perry et al, *Textile Chemist and Colorist*, Vol. 12, No. 12, Dec. 1980, p. 311, Northern Piedmont Section, AATCC, *Textile Chemist and Colorist*, Vol. 13, No. 1, Jan. 1981, p. 17; C. Tomasino and M. B. Taylor II, *Textile Chemist and Colorist*, Vol. 16, No. 12, Dec. 1984, p. 259; and Perry, R. S., U.S. Pat. No. 4,127,382. Some of the compounds discussed in these articles have indeed been found to be effective as formaldehyde scavengers per se. For example, urea and other urea compounds such as ethylene urea and carbohydrazide significantly reduce formaldehyde release from fabrics but suffer themselves from odor formation, fabric discoloration, chlorine retention and buffering of the cure. Nitrogen containing aromatic hetercyclics such as pyrrole, indole and triazoles are also effective scavengers but tend to yellow fabrics at the application levels needed to reduce formaldehyde release to current standards. Non-aromatic alcohols have proven to be effective as formaldehyde scavengers without imparting detrimental physical properties to the fabric. Sorbitol, methoxy glucoside and diethylene glycol are scavengers presently being used to reduce formaldehyde levels.

Although alcohols when used as an additive scavenger can reduce formaldehyde levels of, for example, DMDHEU, their effectiveness depends on the form of the resin. For example, it is not unreasonable for DEG or sorbitol at 3 to 4% on bath weight to reduce the level of a DMDHEU resin which is 800 ppm odor formaldehyde on control fabric to 300 ppm on test fabric for a 63% formaldehyde reduction. Fabric finished with a modified DMDHEU resin may only have 100 ppm odor formaldehyde on the control fabric. The addition of polyols in the durable press finishing formulation as a scavenger may not reduce the formaldehyde level in the test fabric to any significant extent, at least not at reasonable usage levels. In this case polyols can be ineffective as additive formaldehyde scavengers.

It thus is seen that at present there is not a commercially viable formaldehyde scavenger available to reduce odor formaldehyde of a DMDHEU or modified DMDHEU resin as measured by AATCC test method 112-1984 to 25 ppm or less. Chemicals that have been reported to be able to reduce formaldehyde levels on fabrics to very low levels are carbohydrazide and dimethyl-1, 3-acetonedicarboxylate. However, the former adversely affects fabric properties and the latter is water insoluble and costly.

In wood products, particularly particle board, urea has been the scavenger that has received the greatest attention. Other chemical systems such as resorcinol, peroxides, and ammonia treatment have proven marginal in results and expensive. The usage of urea does not pose problems with particle board as it does in textile fabrics, however it must be carefully used or it will adversely affect physical properties of the particle board itself.

In general, urea is not added to the resin mix but is sprayed in a 40% solution as a separate application on the wood particles after resin application. The application level is approximately 0.3% based on the total board weight. This is generally the upper limit of usage on low fuming resins before board properties are affected. At present, the effectiveness of urea as a formaldehyde scavenger in particle board, as well as in other composition board products, is rather variable depending on manufacturing conditions and resin type. Only the low cost of urea accounts for its continued usage. As long as the wood products industry uses UF resins, and as long as formaldehyde reduction remains a governmental priority, there will be a need to develop a more effective scavenger. It is to the provision of such therefore, that the present invention is primarily directed.

SUMMARY OF THE INVENTION

It has now been discovered that acetoacetamide and to a less extent its derivatives dimethylacetoacetamide, monomethylacetoacetamide, diethylacetoacetamide and monoethylacetoacetamide serve as formaldehyde scavenger in reducing the levels of free formaldehyde released from certain cellulosic based products. Specifically, acetoacetamide has been found to be an excellent scavenger in the manufacture of composition boards wherein wood particles are treated with a urea formaldehyde adhesive resin. It has also been discovered that the acetoacetamide also increases the internal bond strength of the board which in turn reduces the needed amount of resin. Acetoacetamide has also been found to be an excellent formaldehyde scavenger in the production of durable press finished fabrics that are finished with a nitrogen containing methylol resin.

DETAILED DESCRIPTION

Acetoacetamide has been discovered to possess many advantages as a formaldehyde scavenger when used in the process of manufacturing composition board. Unlike urea it can be added directly to the UF resin mix or a component of a UF resin mix thereby eliminating the need for a separate application spray. Acetoacetamide does not interfere with the curing process of the resin; nor does it affect moisture absorbency of the finished product as does urea. Although today it is more costly than urea, it may be used at application levels far less than urea and still be effective in achieving very substantial reduction in formaldehyde release from composition board products. As it has been discovered also to increase bond strength of particle board its use enables a lesser amount of the resin to be required without degradation in bond strength. This can effect a cost savings that can generally offset the cost of the scavenger for which it is in effect substituted.

Acetoacetamide also has been discovered to demonstrate a superiority as a formaldehyde scavenger over other known scavengers when used in the process of manufacturing durable press finished fabrics. It is believed to be truly the only known commercially viable formaldehyde scavenger that can reduce the formaldehyde level of durable press finished fabrics to 25 ppm or lower as measured by AATCC test method 112-1984 without affecting fabric properties and at economic usage levels.

EXAMPLE I 10,000 pounds of particle board at 25 lbs./cu. ft. was produced by spray treating wood particles with the following identified urea formaldehyde resin mix in the amount of 10% solution weight based on wood weight:

| Component | Percent Solids on Weight of Bath |
| --- | --- |
| UF Resin (low fuming) | 52.00 |
| Wax paraffin base | 3.20 |
| Catalyst $NH_4SO_2$ | 4.20 |
| Acetoacetamide | .11 |

The treated wood particles were transferred to a continuous particle board press and the sawdust material cured at 375° F. to form board. Control samples and test samples were evaluated as follows for formaldehyde release using the small chamber desiccator method:

| Component | Odor Formaldehyde ($\mu$g/ml) | % Reduction |
| --- | --- | --- |
| Control Board | 1.69 | — |
| Test Board | 1.29 | 24 |

EXAMPLE 2

75,000 pounds of particle board was produced using three different urea-formaldehyde resin formulation mixes. The board weight was three pounds per square foot on ¾ inch board. Sawdust was treated with the resin mixes by spraying the chemicals on the sawdust in a continuous vortex blender. Key variables such as board weight, face and core moisture, blender retention time and press cycle were held constant.

More specifically, three tests were run producing 25,000 pounds of board each. The first trial was the control, the second trial incorporated acetoacetamide, and the third trial used the same amount of acetoacetamide but with a reduction in the resin and catalyst. The formaldehyde level was measured by the small chamber desiccator method which measures parts per million off-gassing of formaldehyde from the board in a four-hour period. Internal board bond strength was measured by the Instron pull test which measure the face in pounds required to pull a 4 by 4 piece of board apart.

| Chemicals | % Solids (on weight of board) |
|---|---|
| Trial 1 - Control | |
| urea-formaldehyde | 6.5 |
| catalyst (NH4SO4) | 0.5 |
| wax emulsion | 0.5 |
| Trial 2 (standard percent resin) | |
| urea-formaldehyde | 6.5 |
| catalyst (NH4SO4) | 0.5 |
| wax emulsion | 0.5 |
| acetoacetamide | 0.06 |
| Trial 3 (resin % reduced by 18%) | |
| urea-formaldehyde | 5.33 |
| catalyst (NH4SO4) | 0.41 |
| wax emulsion | 0.50 |
| acetoacetamide | 0.06 |

The results of the trials were as follows:

| | Trial No. | | |
|---|---|---|---|
| | 1 | 2 | 3 |
| Formaldehyde (PPM) | 808 | 666 | 622 |
| percent reduction | — | 17.6 | 20.5 |
| Internal bond strength (lbs) | 81 | 96 | 92 |
| percent increase | — | 18.5 | 13.6 |

This shows that not only does the addition of acetoacetamide act to reduce the formaldehyde level in particle board but that it also serves to enhance internal bond strength. This in turn permits the use of less of the resin without a corresponding loss in internal bond strength.

In these trials the resin, acidic catalyst and the acetoacetamide were applied to t he wood as a sprayed mixture. However, these three chemicals may be applied separately and in any order provided such is done before pressing.

EXAMPLE 3

A 50/50 polyester cotton fabric was treated with a DMDHEU resin mix at 90% solution add-on, dried and cured at 330° F. for two minutes. The durable press finishing mix contained the following:

| Component | Percent Solids OWB |
|---|---|
| DMDHEU | 8 |
| Catalyst | 1.6 |
| Acetoacetamide | 2.5 |

The cured samples were tested for odor formaldehyde by AATCC test method 112-1984 with the following results:

| Acetoacetamide % OWB | Odor Formaldehyde PPM | % Reduction |
|---|---|---|
| 0 | 439 | — |
| 2.5 | None | 100 |

EXAMPLE 4

A 50/50 polyester cotton fabric was used with two types of modified precatalyzed DMDHEU resins. The fabrics were treated at 80% solution add-on by fabric weight, predried and cured at 330° F. for one minute. The samples were analyzed for odor formaldehyde using the AATCC test method 112-1984. The durable press finishing mixes contained the following:

| Component | Percent Solids OWB |
|---|---|
| Modified Precatalyzed DMDHEU Resin* | 7.5 |
| Acetoacetamide | .3–2.5 |

| % Acetoacetamide | PPM (LO DMDHEU) | % Reduction | PPM (MO DMDHEU) | % Reduction |
|---|---|---|---|---|
| 0 (control) | 77 | — | 149 | — |
| .30 | 40 | 48 | 66 | 56 |
| .45 | 28 | 64 | 31 | 79 |
| .60 | 22 | 71 | 14 | 91 |
| .75 | 18 | 77 | None | 100 |
| 1.50 | None | 100 | None | 100 |
| 2.25 | None | 100 | None | 100 |

*LO DMDHEU = Low Odor Resin
MO DMDHEU = Medium Odor Resin

This data shows a reduction in released formaldehyde from samples treated with durable press finishing compositions containing acetoacetamide as a formaldehyde scavenger. A reduction of approximately 50% occurs at the lowest level of scavenger usage 0.30%)

Although acetoacetamide is preferred, its derivatives also act as a formaldehyde scavenger but at added cost. For example, it has been experimentally found to take 2% OWB of dimethylaccetoacetamide to achieve the same reduction as 0.3% of acetoacetamide. The dimethyl derivative is initially 40% more expensive than acetoacetamide today.

I claim:

1. In the process of manufacturing composition board wherein wood particles are treated with a urea formaldehyde adhesive resin and then cured under acidic and curing temperature conditions, the improvement comprising the step of contacting the wood with a formaldehyde scavenger and wood particles bonding enhancement agent selected from the group consisting of acetoacetamide, dimethylacetoacetamide, monomethylacetoacetamide, diethylacetoacetamide and monoethylacetoacetamide.

2. A process for fabricating particle board comprising the sequential steps of:
   (a) treating wood particles with a formaldehyde based resin, an acidic catalyst and a formaldehyde scavenger and wood bonding enhancement agent selected from the group consisting of acetoacetamide, dimethylacetoacetamide, monomethylacetoacetamide, diethylacetoacetamide and monoethylacetoacetamide;
   (b) pressing the treated wood particles into board form, and
   (c) curing the wood particles.

3. The process of claim 2 wherein step (a) the wood particles are spray treated with a mixture of the formaldehyde resin, an acidic catalyst and said formaldehyde scavenger and wood bonding enhancement agent.

* * * * *